UNITED STATES PATENT OFFICE.

HANS STOCKHAUSEN, OF CREFELD, AND REINHOLD GRUHL, OF CHARLOTTENBURG, GERMANY.

PROCESS OF MANUFACTURING CONDENSATION PRODUCTS FROM FORMALDEHYDE AND PHENOL.

1,150,642.  Specification of Letters Patent.  Patented Aug. 17, 1915.

No Drawing.  Application filed April 1, 1913.  Serial No. 758,254.

*To all whom it may concern:*

Be it known that we, HANS STOCKHAUSEN, manufacturer, and Doktor REINHOLD GRUHL, subjects of the German Emperor, residing, respectively, at Crefeld and at Charlottenburg, near Berlin, Germany, have invented a new and useful Process of Manufacturing Condensation Products from Formaldehyde and Phenol; and we do hereby declare the following to be a full, clear, and exact description of the same.

The invention consists in heating formaldehyde and phenol with or without a condensation agent until the formation of a liquid intermediate product, and in then mixing this intermediate product with ferric chlorid, aluminum chlorid or other compounds of trivalent metals whereby it is converted into a plastic, moldable mass which requires to be heated for only a very short time in order to be converted into the non-meltable, insoluble and inodorous final state. It is preferable to interrupt the reaction between the formaldehyde and phenol by an admixture of cold water and thorough lixiviation with the same, as soon as a condensation product insoluble in water has been formed. The correct time for this can generally be recognized by the previously clear liquid becoming turbid. If no turbidity appears, it suffices to shake a test of the mass with cold water in order to see whether it is already insoluble in water. This interruption of the reaction has the advantage that the liquid intermediate product mixed with ferric chlorid and the like can be converted free from bubbles into the plastic intermediate product and into the solid infusible final product without having to employ a high pressure for preventing bubbles. The utility of the ferric chlorid consists in the following advantages: The converting of the intermediate condensation product into the insoluble and infusible final product by heating takes place in a much shorter time in the presence of ferric chlorid. Furthermore when no pressure is used, it is no more necessary to keep the temperature exactly under 100° C., because by the pressure of ferric chlorid the bubbles are avoided even if the temperature is raised above 100° C. Finally, the products produced by means of ferric chlorid are odorless, while the products produced in the known way smell badly.

The invention may be carried into practice, for example, as follows: 100 g. phenol and 150 g. 40% formaldehyde (or their homologues or analogues) and an admixture of caustic soda lye are heated together. In the heat, a perfectly clear solution gradually forms in which the reaction which is beginning can be observed owing to the formation of heavy streaks which sink to the bottom. As the heat increases bubbles are gradually formed, and now the heat of reaction alone suffices for continuing the formation of the condensation products. After some time the liquid begins to iridize and gradually to become turbid. The original yellow to brown color changes into a whitish yellow, and as soon as this stage is reached the reaction is interrupted by adding cold water. The oily condensation product is precipitated directly at the bottom of the vessel and is repeatedly washed with cold water until the washing water no longer has a whitish turbid appearance. The product is soluble in alcohol, acetone and the like. Ferric chlorid or aluminium chlorid is now added. The quantity thereof depends on the desired degree of plasticity. The more ferric chlorid, the harder is the plastic mass and the shorter the duration of heating for conversion into the final state. The mixture is treated in a rolling mill or a kneading machine, when the further condensation connected with water being split off occurs. The water which is split off can then be removed purely mechanically, e. g. by kneading or rolling the plastic mass. When heated, the mass is converted without the employment of pressure into the infusible and insoluble final product free from bubbles. Before the mass has become insoluble it i either molded in the desired shapes or dissolved in a solvent, e. g. alcohol, and applied by means of a brush or other mechanical device onto a web of paper or the like. After being dried at an ordinary temperature or, more rapidly, at a higher temperature below 100° C., the web of paper or the like is cut into suitable large pieces. A sufficient number of the same are superposed one on another according to the desired thickness of the final product, put under a press and heated. The temperature must exceed 100° C. but may not be so high that the fibers of the papers suffer. After cooling, the plates or slabs are hard, no longer divisible into layers, and resist high temperature, water and oils. The mass can be sawed, planed, filed, cut, drilled, polished, provided with screw-threads and so on. It can be made in any desired shape. The mass is an excellent insulator of the electric current, particularly when a thick, not very porous paper is used. The plastic intermediate product can also be mixed with caoutchouc and sulfur, as well as with filling materials such as minerals, e. g. flakes of mica, powdered mica, powdered marble, or fibrous materials, e. g. cellulose fibers, woolen, cotton and asbestos fibers, cotton, wool, paper, cork, or the like.

An example showing more specifically the amounts of the materials used may be as follows: 100 grams of raw phenol of trade are treated in the described way with 100 grams of formaldehyde (40%) and 40 g. caustic soda lye (30%). The liquid intermediate product so obtained is then thoroughly mixed with 80 grams of molten ferric chlorid. The mass is converted into a black plastic and kneadable mass. It is completely separated from the water produced hereby by kneading or rolling. After drying a very short heating to 100° C. or more is sufficient to produce the infusible white-yellow final product. The plastic mass can be mixed with 30 grams of sulfur before heating it.

The ferric chlorid mentioned in the above example and in the claims can be substituted by its chemical equivalents i. e. aluminum chlorid or other compounds of trivalent metals.

Having thus described our invention, what we claim as new and desire to secure by Letters Patent is:—

1. A process of manufacturing condensation products from formaldehyde and phenol, consisting in heating formaldehyde with phenol until a liquid intermediate product has formed, and in then mixing this intermediate product with ferric chlorid until a plastic, moldable mass is formed, and in heating said mass, whereby the final product is obtained.

2. A process of manufacturing condensation products from formaldehyde and phenol, consisting in heating formaldehyde with phenol until a condensation product insoluble in water is formed, in washing the condensation product with cold water and mixing it with ferric chlorid until a plastic, moldable mass is formed, and in heating the said mass, whereby the final product is obtained.

3. A process of manufacturing condensation products from formaldehyde and phenol, consisting in heating formaldehyde with phenol until a liquid intermediate product is formed, in mixing this intermediate product with ferric chlorid until a plastic, moldable mass is produced, in mixing said mass with caoutchouc and sulfur, and in then heating the mixture thus obtained.

4. A process of manufacturing condensation products from formaldehyde and phenol, consisting in heating formaldehyde with phenol until a condensation product insoluble in water is formed, in washing said condensation product with cold water and mixing it with ferric chlorid until a plastic, moldable mass is obtained, in mixing said mass with caoutchouc and sulfur, and in heating the mixture thus obtained.

5. A process of manufacturing condensation products from formaldehyde and phenol, consisting in heating formaldehyde with phenol until a liquid intermediate product has formed, and in then mixing this intermediate product with ferric chlorid until a plastic, moldable mass is formed, in mixing said mass with filling substances, and in heating said mass, whereby the final product is obtained.

6. A process of manufacturing condensation products from formaldehyde and phenol, consisting in heating formaldehyde with phenol until a condensation product insoluble in wtaer is formed, in washing the condensation product with cold water and mixing it with ferric chlorid until a plastic, moldable mass is formed, in mixing said mass with filling substances, and in heating the said mass, whereby the final product is obtained.

7. A process of manufacturing condensation products from formaldehyde and phenol, consisting in heating formaldehyde with phenol until a liquid intermediate product is formed, in mixing this intermediate product with ferric chlorid until a plastic, moldable mass is produced, in mixing said mass with caoutchouc and sulfur and filling means, and in then heating the mixture thus obtained.

8. A process of manufacturing condensation products from formaldehyde and phenol, consisting in heating formaldehyde with phenol until a condensation product insoluble in water is formed, in washing said condensation product with cold water and mixing it with ferric chlorid until a plastic, moldable mass is obtained, in mixing said mass with caoutchouc and sulfur and filling means, and in heating the mixture thus obtained.

In testimony whereof, we have signed our names to this specification in the presence of two subscribing witnesses.

HANS STOCKHAUSEN.
DOKTOR REINHOLD GRUHL.

Witnesses as to the signature of Hans Stockhausen:
ELIRE KALBUSCH,
HENRY QUADFLIEG.

Witnesses as to the signature of Reinhold Gruhl:
HENRY HASPER,
WOLDEMAR HAUPT.